(12) United States Patent
Yamamoto

(10) Patent No.: US 6,252,914 B1
(45) Date of Patent: Jun. 26, 2001

(54) RADIO COMMUNICATION SYSTEM

(75) Inventor: Takeshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,382

(22) Filed: Jul. 20, 1999

(30) Foreign Application Priority Data

Jul. 21, 1998 (JP) ................................. 10-205307

(51) Int. Cl.[7] .............................. H04K 1/02; H04L 25/03; H04L 25/49
(52) U.S. Cl. .............................. 375/296; 375/221; 455/63
(58) Field of Search .................................. 375/219, 221, 375/232, 230, 296; 455/561, 114, 507, 63, 65; 379/93.31; 381/103, 98; 333/28 R, 28 T

(56) References Cited

U.S. PATENT DOCUMENTS

| | | | |
|---|---|---|---|
| 5,282,222 | * | 1/1994 | Fattouche et al. ............... 375/260 |
| 5,404,378 | * | 4/1995 | Kimura .............................. 375/296 |
| 5,489,879 | * | 2/1996 | English ............................. 332/103 |
| 5,740,520 | * | 4/1998 | Cyze et al. ........................ 455/69 |

FOREIGN PATENT DOCUMENTS

| | | |
|---|---|---|
| 57-63939 | 4/1982 | (JP) . |
| 3-179820 | 8/1991 | (JP) . |
| 4-207636 | 7/1992 | (JP) . |
| 49307820 | 10/1992 | (JP) . |
| 5-244465 | 9/1993 | (JP) . |
| 6-165241 | 6/1994 | (JP) . |
| 7-95655 | 4/1995 | (JP) . |

* cited by examiner

Primary Examiner—Chi Pham
Assistant Examiner—Phuong Phu
(74) Attorney, Agent, or Firm—Sughrue, Mion, Zinn Macpeak & Seas, PLLC

(57) ABSTRACT

A radio communication system for reducing deterioration of the transmission quality due to multipath fading while downsizing a terminal and reducing the power consumption. The propagation characteristic of a propagation path 3 is estimated by an automatic equalizer 30 set in a base station 1, and the inverse characteristic of the propagation path is added to the down-transmission data to be transmitted to a terminal 2 in a predistortion section 50 in accordance with the estimation result, and the data to which the inverse characteristic of the propagation path 3 is added is transmitted to the terminal 2 through the propagation path 3 as transmission data.

8 Claims, 2 Drawing Sheets

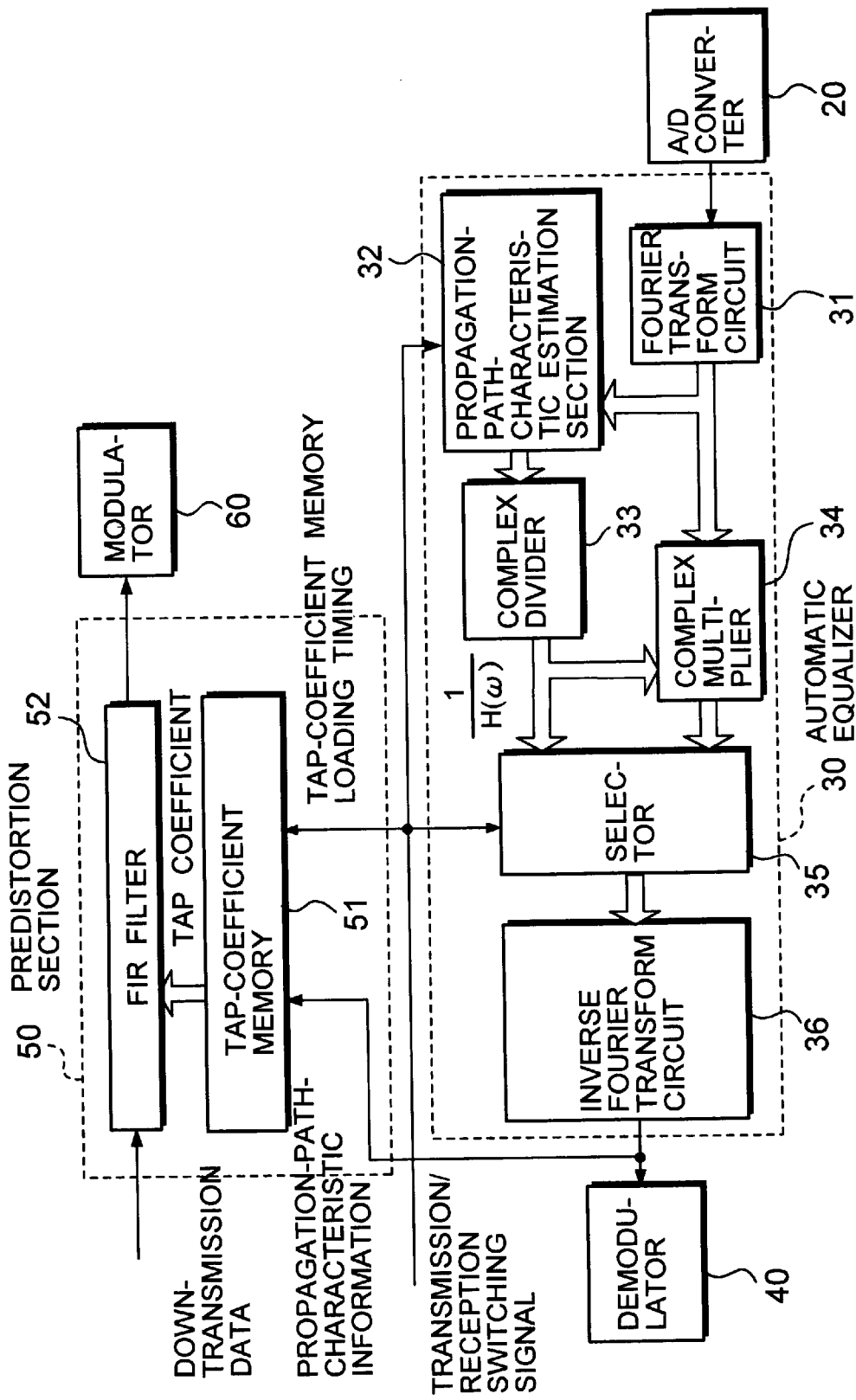

RADIO COMMUNICATION SYSTEM

BACKGROUND OF THE INVENTION

1. Field of the Invention

The present invention relates to a radio communication system, particularly to a radio communication system capable of reducing deterioration of transmission quality due to multipath fading.

2. Description of the Prior Art

As for a conventional radio communication system having at least a terminal and a base station, transmission quality is deteriorated if frequency-selective fading due to a multipath occurs in the propagation path between the terminal and the base station. Therefore, an automatic equalizer is set in a terminal serving as a reception side to thereby reduce deterioration of transmission quality.

In case of an automatic equalizer, however, when the multipath fading of a propagation path greatly acts, it is necessary to increase the size of a circuit in order to conquer the action of the multipath fading. Therefore, problems occur that the size of a terminal to which downsizing and reduction of power consumption are requested is increased and it is difficult to realize a circuit for practical use

BRIEF SUMMARY OF THE INVENTION Object of the Invention

The present invention is made to solve the above problems and its object is to provide a radio communication system capable of reducing deterioration of transmission quality due to multipath fading while downsizing a terminal and reducing the power consumption.

SUMMARY OF THE INVENTION

To attain the above object, the present invention uses a radio communication system having at least a terminal and a base station connected each other through a propagation path and capable of reducing deterioration of transmission quality between the terminal and the base station due to multipath fading in the propagation path, characterized in that the base station comprises:

- a frequency converter for frequency-converting the data sent from the terminal through the propagation path into a base band signal and outputting the signal;
- sample quantization means for sample-quantizing the base band signal output from the frequency converter;
- an automatic equalizer for equalizing distortions of the propagation path about the base band signal sample-quantized by the sample quantization means, estimating the characteristic of the propagation path in accordance with the base band signal sample-quantized by the sample quantization means, and outputting an estimated result;
- a demodulator for demodulating the base band signal whose distortions are equalized by the automatic equalizer;
- a predistortion section for adding the inverse characteristic of the propagation path to the data to be transmitted to the terminal in accordance with the estimated result in the automatic equalizer; and
- a modulator for modulating the data to which the inverse characteristic of the propagation path is added by the predistortion section.

Moreover, the automatic equalizer is characterized by comprising:

- a Fourier transform circuit for transforming the base band signal sample-quantized by the sample quantization means into a frequency-region signal;
- a propagation-path-characteristic estimation section to which frequency-region signals output from the Fourier transform circuit are input to estimate the transfer function of the propagation path in accordance with a reference signal regularly inserted into the data sent from the terminal and a signal corresponding to the reference signal among the frequency-region signals output from the Fourier transform circuit and moreover, estimate the propagation path characteristic of the propagation path;
- a complex divider for computing the inverse characteristic of the propagation path characteristic by applying complex-division to the propagation characteristic estimated by the propagation-path-characteristic estimation section;
- a complex multiplier for multiplying the frequency-region signals output from the Fourier transform circuit with the inverse characteristic of the propagation path characteristic computed by the complex divider;
- selection means for outputting the multiplication result computed by the complex multiplier when the base station receives data from the terminal and, after the base station receives the data transmitted from the terminal, outputting the computation result computed by the complex divider; and
- an inverse Fourier transform circuit for inverse-Fourier-transforming the multiplication result computed by the complex multiplier or the computation result computed by the complex divider, input through the selection means.

Furthermore, the predistortion section is characterized by comprising inverse characteristic addition means for adding the inverse characteristic of the propagation path computed by the complex divider and inverse-Fourier-transformed by the inverse Fourier transform circuit to the data to be transmitted to the terminal at the timing when the base station completes the reception of the data transmitted from the terminal.

Furthermore, the inverse characteristic addition means is characterized by adding the inverse characteristic of the propagation path to the data to be transmitted to the terminal by using the inverse characteristic of the propagation path as a tap coefficient and thereby, performing the convolutional operation between the inverse characteristic of the propagation path and the data to be transmitted to the terminal.

Furthermore, the predistortion section is characterized by comprising storage means for storing the inverse characteristic of the propagation path as a tap coefficient at the timing when the base station completes the reception of the data transmitted from the terminal, and the inverse characteristic addition means is characterized by performing the convolutional operation between the inverse characteristic of the propagation path stored in the storage means as a tap coefficient and the data to be transmitted to the terminal and by adding the inverse characteristic of the propagation path to the data to be transmitted to the terminal.

Furthermore, the sample quantization means is characterized by comprising an A/D converter.

As for the present invention configured as described above, the propagation characteristic of a propagation path is estimated by an automatic equalizer set in a base station, the inverse characteristic of the propagation path is added to the down-transmission data to be transmitted to a terminal in a predistortion section in accordance with the estimation result, and the data to which the inverse characteristic of the propagation path is added is transmitted to the terminal as transmission data through the propagation path. Therefore, even if a distortion due to a multipath occurs in the propagation path, a down-link signal transmitted from a base station is correctly received by a terminal without setting any function for reducing deterioration of transmission quality due to multipath fading to the terminal and therefore, transmission quality is not deteriorated.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 2 is an illustration showing the configuration of the automatic equalizer and predistortion section shown in FIG. 1.

DETAILED DESCRIPTION OF THE PREFERRED EMBODIMENTS

Figure 1:
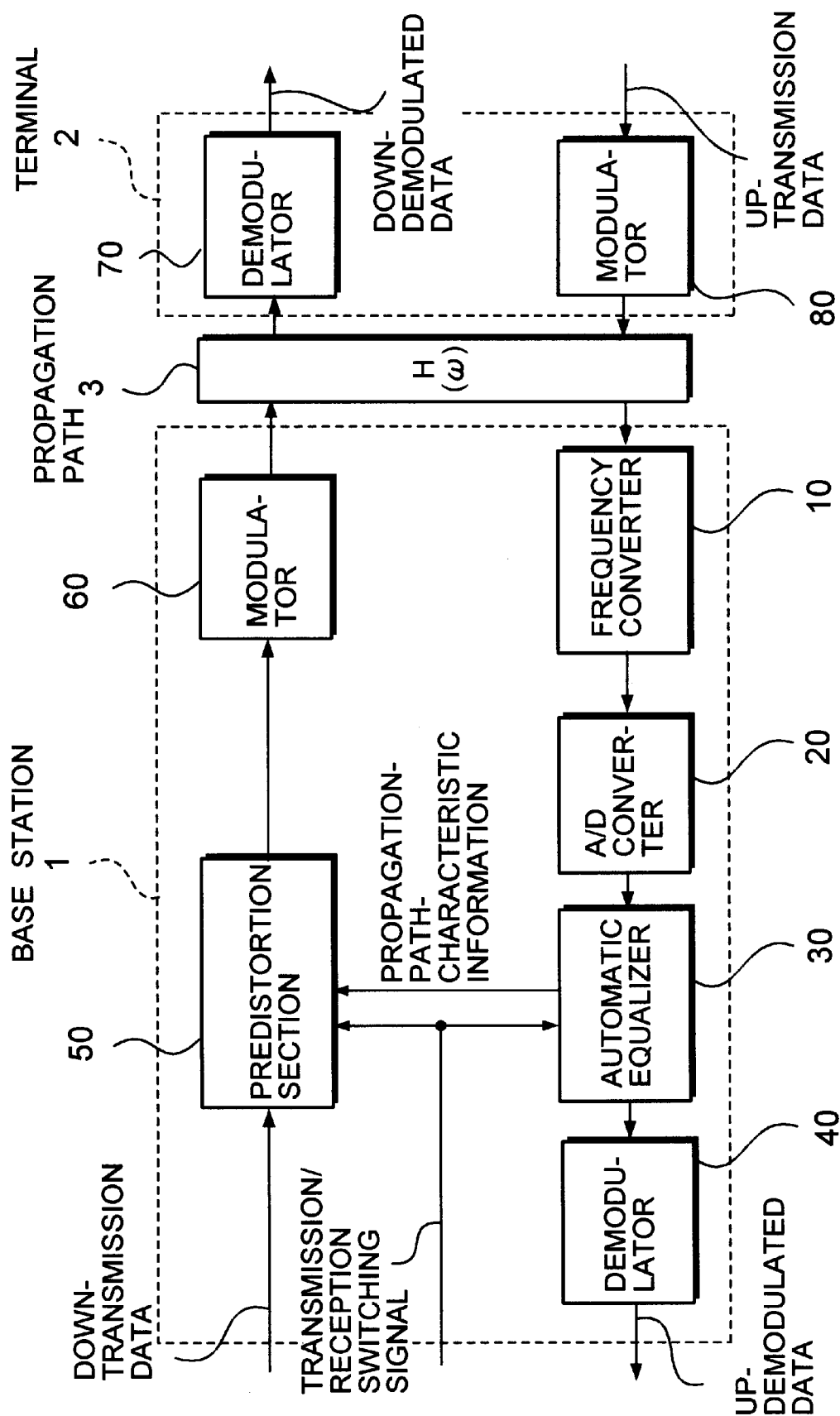
FIG. 1 is an illustration showing an embodiment of a radio communication system of the present invention.

The preferred embodiment of the present invention will be described below by referring to the accompanying drawings.

FIG. 1 is an illustration showing an embodiment of a radio communication system of the present invention.

As shown in FIG. 1, this embodiment is configured by a terminal 2 and a base station 1 connected each other through a propagation path 3, in which the terminal 2 is provided with a demodulator 70 for demodulating the down-data sent from the base station 1 through the propagation path 3 and a modulator 80 for modulating the down-data to be transmitted to the base station 1 through the propagation path 3 and the base station 1 is provided with a frequency converter 10 for frequency-converting the up-data sent from the terminal 2 through the propagation path 3 into a base band signal and outputting the signal, an A/D converter 20 serving as sample quantization means for sample-quantizing the base band signal outputted from the frequency converter 10, an automatic equalizer 30 for equalizing distortions of the propagation path 3 about the base band signal sample-quantized by the A/D converter 20, estimating the characteristic of the propagation path 3 in accordance with the base band signal sample-quantized by the A/D converter 20, and outputting the estimation result as propagation-path-characteristic information, a demodulator 40 for demodulating the base band signal whose distortions are equalized by the automatic equalizer 30, a predistortion section 50 for adding the inverse characteristic of the propagation path 3 to down-transmission data in accordance with the propagation-path-characteristic information outputted from the automatic equalizer 30, and a modulator 60 for modulating the down-transmission data to which the inverse characteristic of the propagation path 3 is added by the predistortion section 50.

FIG. 2 is an illustration showing the configuration of the automatic equalizer 30 and the predistortion section 50 shown in FIG. 1.

As shown in FIG. 2, the automatic equalizer 30 of this embodiment is configured by a Fourier transform circuit 31 for transforming a base band signal sample-quantized by the A/D converter 20 into a frequency-region signal and outputting the signal; a propagation-path-characteristic estimation section 32 to which frequency-region signals outputted from the Fourier transform circuit 31 are inputted to estimate a reference signal for estimating the transfer function of the propagation path 3 in accordance with a signal corresponding to a reference signal for estimating a known propagation path characteristic regularly inserted into the up-data sent from the terminal 2 and a frequency-region signal corresponding to the reference signal among the frequency-region signals outputted from the Fourier transform circuit 31 and moreover, estimate the propagation-path characteristic H ($\omega$) of the propagation path 3; a complex divider 33 for computing the inverse characteristic 1/H ($\omega$) of the propagation-path characteristic H ($\omega$) estimated by the propagation path-characteristic estimation section 32 by applying complex division to the propagation-path characteristic H ($\omega$) estimated by the propagation path-characteristic estimation section 32; a complex multiplier 34 for multiplying the frequency-region signals outputted from the Fourier transform circuit 31 with the inverse characteristic 1/H ($\omega$) of the propagation path 3 computed by the complex divider 33 and thereby, equalizing distortions of the propagation path 3; a selector 35 serving as selection means for outputting a signal whose distortions are equalized by the complex multiplier 34 when receiving up-data from the terminal 2 and outputting the inverse characteristic 1/H ($\omega$) of the propagation path 3 computed by the complex divider 33 after receiving the up-data, in accordance with a transmission/reception switching signal inputted from an external unit; and an inverse Fourier transform circuit 36 for inverse-Fourier-transforming a signal whose distortions are equalized by the complex multiplier 34 when the signal is inputted and outputting the signal to the demodulator 40 as a time-region signal, applying inverse Fourier transform to the inverse characteristic 1/H ($\omega$) of the propagation path 3 computed by the complex divider 33 when the inverse characteristic 1/H ($\omega$) is inputted, thereby computing an impulse response, and outputting the computation result to the predistortion section 50.

Moreover, as shown in FIG. 2, the predistortion section 50 of this embodiment is configured by a tap-coefficient memory 51 serving as storage means for storing the impulse response of the inverse characteristic 1/H ($\omega$) of the propagation path 3 output from the inverse Fourier transform circuit 36 at the timing after receiving the up-data transmitted from the terminal 2, in accordance with a transmission/ reception switching signal inputted from an external unit and an FIR filter 52 serving as inverse characteristic addition means for performing the convolutional operation between down-transmission data to be transmitted to the terminal 2 and the impulse response of the inverse characteristic 1/H ($\omega$) of the propagation path 3 by using the impulse response stored in the tap coefficient memory 51 as a tap coefficient and adding the inverse characteristic of the propagation path 3 to the down-transmission data.

In this case, when a modulation method uses the QPSK method, the data inputted to the FIR filter 52 has a binary value. Therefore, as for the multiplication between the data and the tap coefficient, it is actually only necessary to set the polarity bit of the tap coefficient to a positive phase or invert the bit in accordance with the value of input data. That is, in case of the QPSK method, it is possible to form the FIR filter 52 with a simple circuit without using any multiplier.

The data transmission operation of a radio communication system having the above configuration will be described below.

The up-transmission data supplied from the terminal 2 is modulated by the modulator 80 in the terminal 2 and transmitted to the base station 1 through the propagation path 3.

In the base station 1, the up-data sent from the terminal 2 through the propagation path 3 is first frequency-converted into a base band signal by the frequency converter 10 and the base band signal outputted from the frequency converter 10 is sample-quantized by the A/D converter 20.

Then, in the Fourier transform circuit 31 of the automatic equalizer 30, the base band signal sample-quantized by the A/D converter 10 is converted into a frequency-region signal and outputted to the propagation-path-characteristic estimation section 32 and complex multiplier 34.

Then, in the propagation-path-characteristic estimation section 32, the transfer function of the propagation path 3 is estimated in accordance with a reference signal for estimating a known propagation path characteristic regularly inserted into the up-data sent from the terminal 2 and a frequency-region signal corresponding to the reference signal among the frequency-region signals outputted from the Fourier transform circuit 31 and thereby, the propagation path characteristic $H(\omega)$ of the propagation path 3 is estimated.

Then, in the complex divider 33, the propagation path characteristic $H(\omega)$ estimated by the propagation-path-characteristic estimation section 32 is complex-divided and thereby, the inverse characteristic $1/H(\omega)$ of the propagation path characteristic $H(\omega)$ estimated by the propagation-path-characteristic estimation section 32 is computed.

Then, in the complex multiplier 34, frequency-region signals outputted from the Fourier transform circuit 31 are multiplied with the inverse characteristic $1/H(\omega)$ of the propagation path 3 computed by the complex divider 33 and thereby, distortions of the propagation path 3 are equalized about the frequency-region signals outputted from the Fourier transform circuit 31.

The inverse characteristic $1/H(\omega)$ of the propagation path 3 computed by the complex divider 33 and the signals in which distortions of the propagation path 3 are equalized by the complex multiplier 34 are inputted to the selector 35.

In the selector 35, a signal whose distortions are equalized by the complex multiplier 34 is outputted when receiving up-data from the terminal 2 and the inverse characteristic $1/H(\omega)$ of the propagation path 3 computed by the complex divider 33 is outputted after receiving the up-data, in accordance with a transmission/reception switching signal inputted from an external unit.

Then, when a signal whose distortions are equalized by the complex multiplier 34 is inputted to the inverse Fourier transform circuit 36, the signal is inverse-Fourier-transformed and outputted to the demodulator 40 as a time-region signal, and the signal outputted from the inverse Fourier transform circuit 36 is demodulated by the demodulator 40 and outputted as up-demodulated data.

When the inverse characteristic $1/H(\omega)$ of the propagation path 3 computed by the complex divider 33 is inputted, the inverse characteristic $1/H(\omega)$ of the propagation path 3 is inverse-Fourier-transformed and thereby, an impulse response is computed and the computed impulse response is outputted to the predistortion section 50.

Then, the impulse response of the inverse characteristic $1/H(\omega)$ of the propagation path 3 outputted from the inverse Fourier transform circuit 36 is stored in the tap-coefficient memory 51 of the predistortion section 50 at the timing after receiving the up-data transmitted from the terminal 2 in accordance with a transmission/reception switching signal inputted from an external unit.

Then, in the FIR filter 52, the convolutional operation between the down-transmission data to be transmitted to the terminal 2 and the impulse response of the inverse characteristic $1/H(\omega)$ of the propagation path 3 is performed by using the impulse response stored in the tap-coefficient memory 51 as a tap coefficient and thereby, the inverse characteristic of the propagation path 3 is added to the down-transmission data and output to the converter 60.

Then, down-transmission data to which the inverse characteristic of the propagation path 3 is added by the predistortion section 50 is modulated by the modulator 60 and the modulated down-transmission data is transmitted to the terminal 2 through the propagation path 3.

Thereafter, when the down-data transmitted from the base station 1 is received by the terminal 2 through the propagation path 3, the received down-data is demodulated by the demodulator 70 in the terminal 2 and outputted as down-demodulated data.

As described above, in the case of this embodiment, the propagation characteristic of the propagation path 3 is estimated by the automatic equalizer 30 in the base station 1 and the inverse characteristic of the propagation path 3 is added to the down-transmission data to be transmitted to the terminal 2 in accordance with the estimation result. Therefore, even when a distortion is produced due to a multipath in the propagation path 3, the down-data transmitted from the base station 1 is correctly received by the terminal 2 and thereby, transmission quality is not deteriorated.

As described above, the present invention is configured so that the propagation characteristic of a propagation path is estimated by an automatic equalizer set in a base station, the inverse characteristic of the propagation path is added to the down-transmission data to be transmitted to a terminal in a predistortion section in accordance with the estimation result and the data to which the inverse characteristic of the propagation path is added is transmitted to the terminal through the propagation path as transmission data. Therefore, even when a distortion is produced in the propagation path due to a multipath, a down-link signal transmitted from the base station is correctly received by the terminal without setting any function for reducing deterioration of transmission quality due to multipath fading to the terminal and thus, it is possible to reduce deterioration of transmission quality.

Thereby, it is possible to reduce deterioration of transmission quality due to multipath fading while downsizing a terminal and reducing the power consumption.

What is claimed is:

1. A radio communication system having a terminal and a base station connected to each other through a propagation path and capable of reducing deterioration of transmission quality between the terminal and the base station due to multipath fading in the propagation path, the base station comprising:

a frequency converter for frequency-converting data sent from the terminal through the propagation path into a base band signal and outputting the signal;

a sample quantizer for sample-quantizing the base band signal output from the frequency converter;

an automatic equalizer for equalizing distortions of the propagation path about the base band signal sample-quantized by the sample quantizer, estimating a characteristic of the propagation path in accordance with the base band signal sample-quantized by the sample quantizer, and outputting an estimated result;

a demodulator for demodulating the base band signal whose distortions are equalized by the automatic equalizer;

a predistortion section for adding the inverse of the characteristic of the propagation path to data to be transmitted to the terminal in accordance with the estimated result from the automatic equalizer; and a modulator for modulating the data to which the inverse characteristic of the propagation path is added by the predistortion section, wherein the automatic equalizer comprises:

a Fourier transform circuit for transforming the base band signal sample-quantized by the sample quantizer into a frequency-region signal;

a propagation-path-characteristic estimation section to which frequency-region signals output from the Fourier transform circuit are input to estimate a transfer function of the propagation path in accordance with a reference signal regularly inserted into data sent from the terminal and a signal corresponding to the reference signal among the frequency-region signals output from the Fourier transform circuit, in order to estimate a propagation path characteristic of the propagation path;

a complex divider for computing the inverse characteristic of the propagation path characteristic by applying complex-division to the propagation path characteristic estimated by the propagation-path-characteristic estimation section, a complex multiplier for multiplying the frequency-region signals output from the Fourier transform circuit with the inverse characteristic computed by the complex divider;

a selector for outputting the multiplication result computed by the complex multiplier when the base station receives data from the terminal and, after the base station receives the data transmitted from the terminal, outputting the computation result computed by the complex divider; and an inverse Fourier transform circuit for inverse-Fourier-transforming the multiplication result computed by the complex multiplier or the computation result computed by the complex divider, input via the selector.

2. The radio communication system according to claim 1, wherein the predistortion section has an inverse characteristic adder for adding the inverse characteristic of the propagation path computed by the complex divider and inverse-Fourier-transformed by the inverse Fourier transform circuit to data to be transmitted to the terminal at a time when the base station completes the reception of the data transmitted from the terminal.

3. The radio communication system according to claim 2, wherein the inverse characteristic adder adds the inverse characteristic of the propagation path to data to be transmitted to the terminal by using the inverse characteristic of the propagation path as a tap coefficient, thereby performing a convolutional operation between the inverse characteristic of the propagation path and the data to be transmitted to the terminal.

4. The radio communication system according to claim 3, wherein the predistortion section has a storage part for storing the inverse characteristic of the propagation path as a tap coefficient at the timing when the base station completes the reception of the data transmitted from the terminal, and the inverse characteristic adder performs the convolutional operation between the inverse characteristic of the propagation path stored in the storage part as a tap coefficient and the data to be transmitted to the terminal, and adds the inverse characteristic of the propagation path to the data to be transmitted to the terminal.

5. A radio communication system having a terminal and a base station connected to each other through a propagation path and capable of reducing deterioration of transmission quality between the terminal and the base station due to multipath fading in the propagation path, the base station comprising:

an automatic equalizer included in the base station for equalizing distortions of the propagation path about a base band signal sample-quantized by a sample quantizer, estimating the characteristic of the propagation path in accordance with the base band signal sample-quantized by the sample quantizer, and outputting an estimated result, the equalizer comprising:

a Fourier transform circuit for transforming the base band signal sample-quantized by the sample quantizer into a frequency-region signal;

a propagation-path-characteristic estimation section to which frequency-region signals output from the Fourier transform circuit are input in order to estimate a transfer function of the propagation path in accordance with a reference signal regularly inserted into data sent from the terminal and a signal corresponding to the reference signal among the frequency-region signals output from the Fourier transform circuit, in order to estimate a propagation path characteristic of the propagation path;

a complex divider for computing an inverse characteristic of the propagation path characteristic by applying complex-division to the propagation path characteristic estimated by the propagation-path-characteristic estimation section, a complex multiplier for multiplying the frequency-region signals output from the Fourier transform circuit with the inverse characteristic of the propagation path characteristic computed by the complex divider;

a selector for outputting the multiplication result computed by the complex multiplier when the base station receives data from the terminal and, after the base station receives the data transmitted from the terminal, outputting the computation result computed by the complex divider; and an inverse Fourier transform circuit for inverse-Fourier-transforming the multiplication result computed by the complex multiplier or the computation result computed by the complex divider, input via the selector.

6. A radio communication system having a terminal and a base station connected to each other through a propagation path and capable of reducing deterioration of transmission quality between the terminal and the base station due to multipath fading in the propagation path, the base station comprising:

a predistortion section having an inverse characteristic adder for adding an inverse characteristic of the propagation path, the inverse characteristic computed by complex division and by inverse-Fourier-transformation, to data to be transmitted to the terminal at a time when the base station completes reception of the data transmitted from the terminal, wherein the inverse characteristic adder adds the inverse characteristic of the propagation path to the data to be transmitted to the terminal by using the inverse characteristic of the propagation path as a tap coefficient, thereby performing a convolutional operation between the inverse characteristic of the propagation path and the data to be transmitted to the terminal.

7. A radio communication system having a terminal and a base station connected to each other through a propagation path and capable of reducing deterioration of transmission quality between the terminal and the base station due to multipath fading in the propagation path, the base station comprising:

a predistortion section having an inverse characteristic adder for adding an inverse characteristic of the propagation path, the inverse characteristic computed by complex division and by inverse-Fourier-transformation, to data to be transmitted to the terminal at a time when the base station completes reception of the data transmitted from the terminal, wherein the predistortion section has a storage part for storing the inverse characteristic of the propagation path as a tap coefficient at the time when the base station completes the reception of the data transmitted from the terminal, and wherein the inverse characteristic adder performs the convolutional operation between the inverse characteristic of the propagation path stored in the storage part as a tap coefficient and the data to be transmitted to the terminal and adds the inverse characteristic of the propagation path to the data to be transmitted to the terminal.

8. A base station for a radio communication communicating with a terminal having an automatic equalizer for equalizing distortions of a propagation path about a base band signal sample-quantized by a sample quantizer, estimating a characteristic of the propagation path in accordance with the sample-quantized base band signal, and outputting an estimated result, the automatic equalizer comprising:

a Fourier transform circuit for transforming the base band signal sample-quantized by the sample quantizer into a frequency-region signal;

a propagation-path-characteristic estimation section to which frequency-region signals output from the Fourier transform circuit are input to estimate the transfer function of the propagation path in accordance with a reference signal regularly inserted into the data sent from the terminal and a signal corresponding to the reference signal among the frequency-region signals output from the Fourier transform circuit, in order to estimate the propagation path characteristic of the propagation path;

a complex divider for computing an inverse characteristic of the propagation path characteristic by applying complex-division to the propagation path characteristic estimated by the propagation-path-characteristic estimation section;

a complex multiplier for multiplying the frequency-region signals output from the Fourier transform circuit with the inverse characteristic of the propagation path characteristic computed by the complex divider;

a selector for outputting the multiplication result computed by the complex multiplier when the base station receives data from the terminal and, after the base station receives the data transmitted from the terminal, outputting the computation result computed by the complex divider; and an inverse Fourier transform circuit for inverse-Fourier-transforming the multiplication result computed by the complex multiplier or the computation result computed by the complex divider, input through the selector.

* * * * *